(12) United States Patent
Sato et al.

(10) Patent No.: US 7,265,779 B2
(45) Date of Patent: Sep. 4, 2007

(54) ELECTRONIC CAMERA, INFORMATION OBTAINING SYSTEM AND PRINT ORDER SYSTEM

(75) Inventors: Tsuneo Sato, Asaka (JP); Koji Kobayashi, Asaka (JP)

(73) Assignee: Fuji Photo Film Co., Ltd., Minami-Ashigara-shi (JP)

( * ) Notice: Subject to any disclaimer, the term of this patent is extended or adjusted under 35 U.S.C. 154(b) by 1183 days.

(21) Appl. No.: 09/811,464

(22) Filed: Mar. 20, 2001

(65) Prior Publication Data

US 2001/0024236 A1    Sep. 27, 2001

(30) Foreign Application Priority Data

Mar. 21, 2000    (JP)    ............... 2000-078738

(51) Int. Cl.
    *H04N 5/225*    (2006.01)

(52) U.S. Cl. ............... 348/207.1; 348/211.2; 455/556.1

(58) Field of Classification Search ........... 348/207.99, 348/207.1, 207.2, 211.99, 211.1, 211.2, 211.3, 348/211.8, 239; 455/556.1, 557.1; 396/57, 396/2
See application file for complete search history.

(56) References Cited

U.S. PATENT DOCUMENTS

| 5,737,491 A * | 4/1998 | Allen et al. ............... 704/270 |
| 5,768,633 A * | 6/1998 | Allen et al. ............... 396/2 |
| 6,115,611 A * | 9/2000 | Kimoto et al. ........... 455/456.3 |
| 6,337,951 B1 * | 1/2002 | Nakamura .................. 396/57 |
| 6,396,537 B1 * | 5/2002 | Squilla et al. ............. 348/239 |
| 2002/0041329 A1 * | 4/2002 | Steinberg .................... 348/207 |

FOREIGN PATENT DOCUMENTS

| JP | 8-147370 | 6/1996 |
| JP | 10-161227 | 6/1998 |

* cited by examiner

*Primary Examiner*—Tuan Ho
(74) *Attorney, Agent, or Firm*—McGinn IP Law Group, PLLC (57) ABSTRACT

The camera comprises: an imaging device; a communicating device for transmitting and receiving information to and from a portable telephone capable of determining the communication area, and obtaining the images and maps of the imaging place and the information on the printing shops on the basis of information of the communication area held by the portable telephone; and a display for displaying the obtained images and maps of the imaging place and the information on the printing shops. The user can easily obtain and display the images and maps of the imaging place and the information on the printing shops.

15 Claims, 10 Drawing Sheets

ELECTRONIC CAMERA, INFORMATION OBTAINING SYSTEM AND PRINT ORDER SYSTEM

BACKGROUND OF THE INVENTION

1. Field of the Invention

The present invention relates to an electronic camera, an information obtaining system and a print order system, and more particularly to an electronic camera which can communicate with a portable communication device and can obtain information on an image-capturing place and information related to a printing shop through the external communication device.

2. Description of Related Art

Japanese Patent Application Laid-Open No. 8-147370 discloses a system in which tourism service information is obtained and goods are ordered in an interactive manner on the basis of the information. However, it has been possible for the user only to order goods and it has been impossible for the user to combine an image optically-captured by the user with an image gotten in a tourist spot or the like where the user visits in his trip so as to synthesize a new image.

Japanese Patent Application Laid-Open No. 10-161227 discloses a system in which main data is received from an external image-capturing information transmitter and recorded. However; it has been impossible to combine an optically-captured image with received data.

Moreover, there has been known a camera for recording positional information as well as an image on the basis of map information previously recorded on a recording medium. However, since the quantity of the previously recorded map information is limited, there has been an inconvenience that the positional information cannot be obtained in places except the recorded map information.

Furthermore, there has been known a camera for getting positional information from a global positioning system (GPS) to record it. However, the camera must be equipped with a GPS antenna in order to implement the functions of the GPS in the camera so as to obtain the positional information of the image-capturing place. Therefore, there has been an inconvenience that the size of the camera itself is increased and the cost of the camera is raised.

SUMMARY OF THE INVENTION

The present invention has been made in view of these circumstances, and it is an object of the present invention to provide an electronic camera and an information obtaining system which allows the images or the maps of neighboring tourist spots to be easily obtained.

Further, it is another object of the present invention to provide an information obtaining system in which a correction can be applied to the positional information of an image-capturing place obtained via a communication device and both an image optically-captured by a user and the corrected positional information can be recorded together and a print order system in which a printing shop to which a print order is sent can be readily selected.

In order to attain the above described objects, the present invention is directed to an electronic camera which obtains a desired image from a server storing images of tourist spots and providing an image in accordance with a request from a user through an external communication device capable of determining a communication area where the external communication device is, the electronic camera comprising: a communication device which transmits a request for obtaining an image of a tourist spot to the server through the external communication device and receives information and the image of the tourist spot around the communication area from the server; a display which displays the information and the image of the tourist spot obtained from the server through the external communication device; an information input device which selects and inputs a desired image from the displayed tourist spot information; and a recording medium which records the image of the tourist spot received through the external communication device and records an image gotten by an imaging operation.

According to the present invention, the images of the tourist spot in the neighborhood can be easily acquired.

Preferably, the camera further comprises an information processing device which combines the image of the tourist spot recorded on the recording medium with the image obtained by the imaging operation.

Further, the present invention is directed to an electronic camera which transmits information to and receives information from a server having information of printing shops and transferring an image to a printing shop in accordance with a request for print from a user through an external communication device capable of determining a communication area where the external communication device is, the electronic camera comprising: a communication device which receives printing shop information in a neighborhood of the communicating area from the server and transmits an image to the printing shop; a display which displays the printing shop information obtained from the server through the communication device; and an information input device which selects and inputs a desired printing shop from the displayed printing shop information.

According to the present invention, the printing shop which is ordered to print the image can be easily selected.

Still further, the present invention is directed to an information obtaining system, comprising: a server which stores images of tourist spots and provides an image in accordance with a request from a user; and an electronic camera which obtains a desired image from the server through an external communication device capable of determining a communication area where the external communication device is, wherein the electronic camera comprises: an imaging device which captures an image of an object; a communication device which transmits a request for obtaining an image of a tourist spot to the server through the external communication device and receives the image of the tourist spot from the server; and a recording medium which records the image of the tourist spot received by the communication device and the image captured by an imaging operation, wherein the server comprises: an image selecting device which selects the image of the tourist spot in the neighborhood on the basis of the information of the communication area of the external communication device when there is sent the request for obtaining the image of the tourist spot through the external communication device from the electronic camera; and a transmitting device which transmits the selected image of the tourist spot to the electronic camera.

According to the present invention, the images of the tourist spots in the neighborhood can be gotten with ease.

Still further, the present invention is directed to a print order system, comprising: an electronic camera which transmits an image ordered to be printed to a server through an external communication device capable of determining a communication area where the external communication device is; and the server which receives the order for printing the image transmitted from the electronic camera through the external communication device and transmits the received image to a printing shop in a neighborhood of the communication area, wherein the electronic camera comprises: an information input device which selects and inputs the image ordered to be printed from a recording medium on which images are recorded; a communication device which transmits the image ordered to be printed which is selected and inputted to the server through the external communication device and receives information of the printing shop in the neighborhood from the server; and a display which displays the received information of the printing shop, wherein the server comprises: a selecting device which selects the printing shop in the neighborhood on the basis of information of the communication area of the external communication device when the print order is requested from the electronic camera through the external communication device; and a transmitting device which transmits the image ordered to be printed to the selected printing shop and transmits the information of the printing shop to the electronic camera.

According to the present invention, the printing shop that is ordered to print the image can be readily selected.

Furthermore, the present invention is directed to an information obtaining system comprising: a server which has map data and provides the map data in accordance with a request from a user; and an electronic camera which obtains desired map data from the server through an external communication device capable of determining a communication area where the external communication device is, wherein the electronic camera comprises: a communication device which transmits a request for map data to the server through the external communication device and receives the map data from the server; a recording medium which records the map data received by the communication device; and a display which displays a map on the basis of the map data recorded on the recording medium, wherein the server comprises: a selecting device which selects the map data in a neighborhood on the basis of the information of the communication area of the external communication device when a request for obtaining the map data is supplied from the electronic camera; and a transmitting device which transmits the map data selected by the selecting device to the electronic camera.

According to the present invention, the map of the tourist spot in the neighborhood can be easily obtained.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Referring to the accompanying drawings, preferred embodiments of an electronic camera, an information obtaining system and a print order system will be described in more detail.

Figure 1:
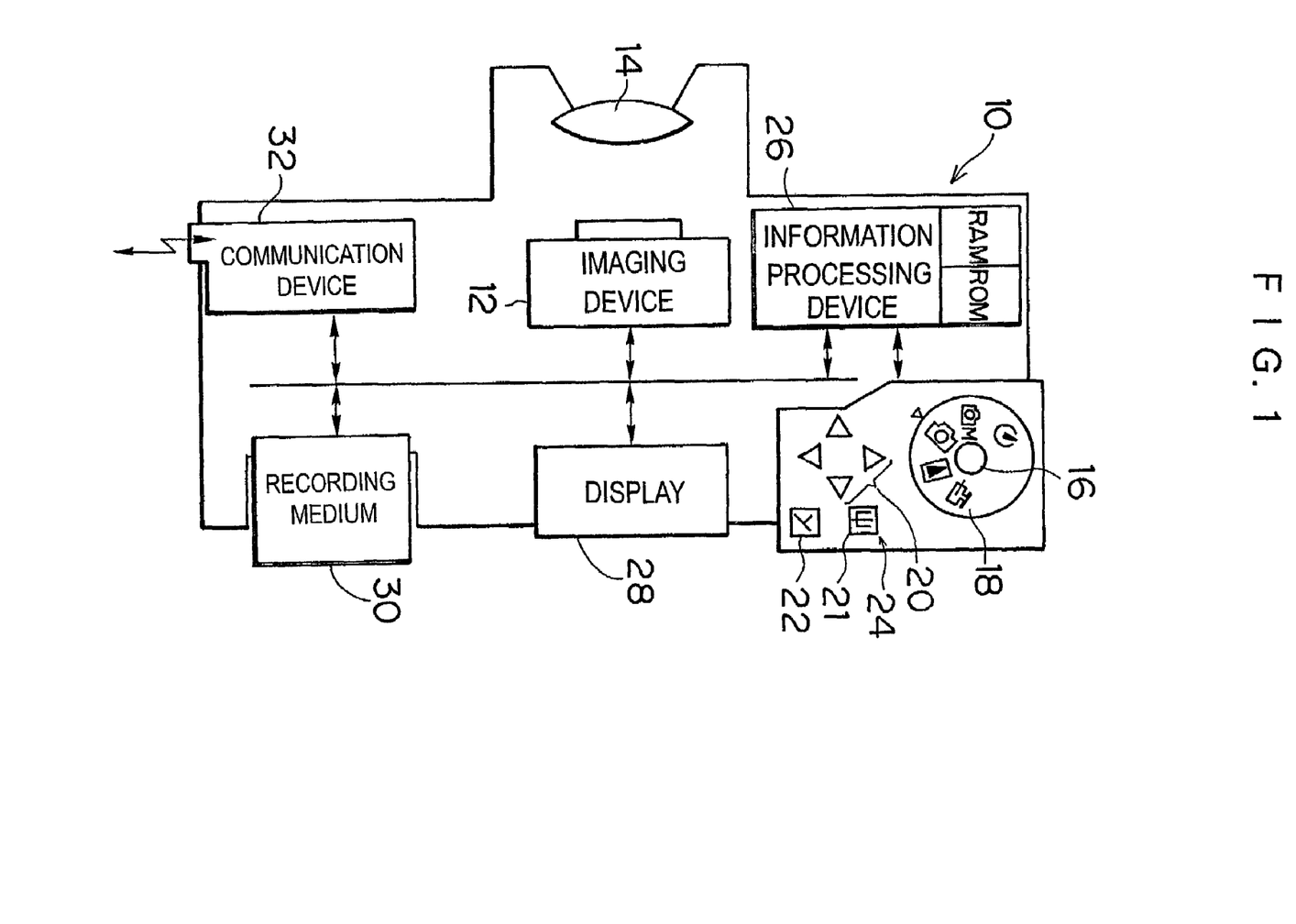
FIG. 1 is a block diagram of an electronic camera.

FIG. 1 is a block diagram of an electronic camera according to an embodiment of the present invention.

In FIG. 1, an electronic camera 10 comprises: a lens 14 for forming an image of an object to be captured on an imaging device 12; an information input device 24 including a shutter release switch 16 by which the user instructs an image to be optically-captured in the electronic camera 10, a mode change switch 18 for changing the operation mode of the electronic camera 10, a cursor switch 20 for moving a cursor, a range selecting switch 21 for selecting a range, and a determination switch 22 for instructing selecting information to be determined; an information processing device 26 for performing processes such as a process of the optically-captured image, a process for editing the image, a synthesizing process of the image or the information, a correction process of a present position, and a process corresponding to the switch information of the information input device 24; a display 28 for displaying the image or the inputted information; a recording medium 30 for recording link information upon combination of image data or the image; and a communication device 32 for bidirectionally transmitting and receiving the information such as the image data between an external communication device and the communication device 32.

The information processing device 26 is provided with a ROM in which a program for controlling the electronic camera 10, map information, sightseeing information, the information of an access point to be communicated and connected and various kinds of constants are stored, and a RAM serving as the working area of the information processing device 26 and storing therein information gotten through the external communication device.

Figure 2:
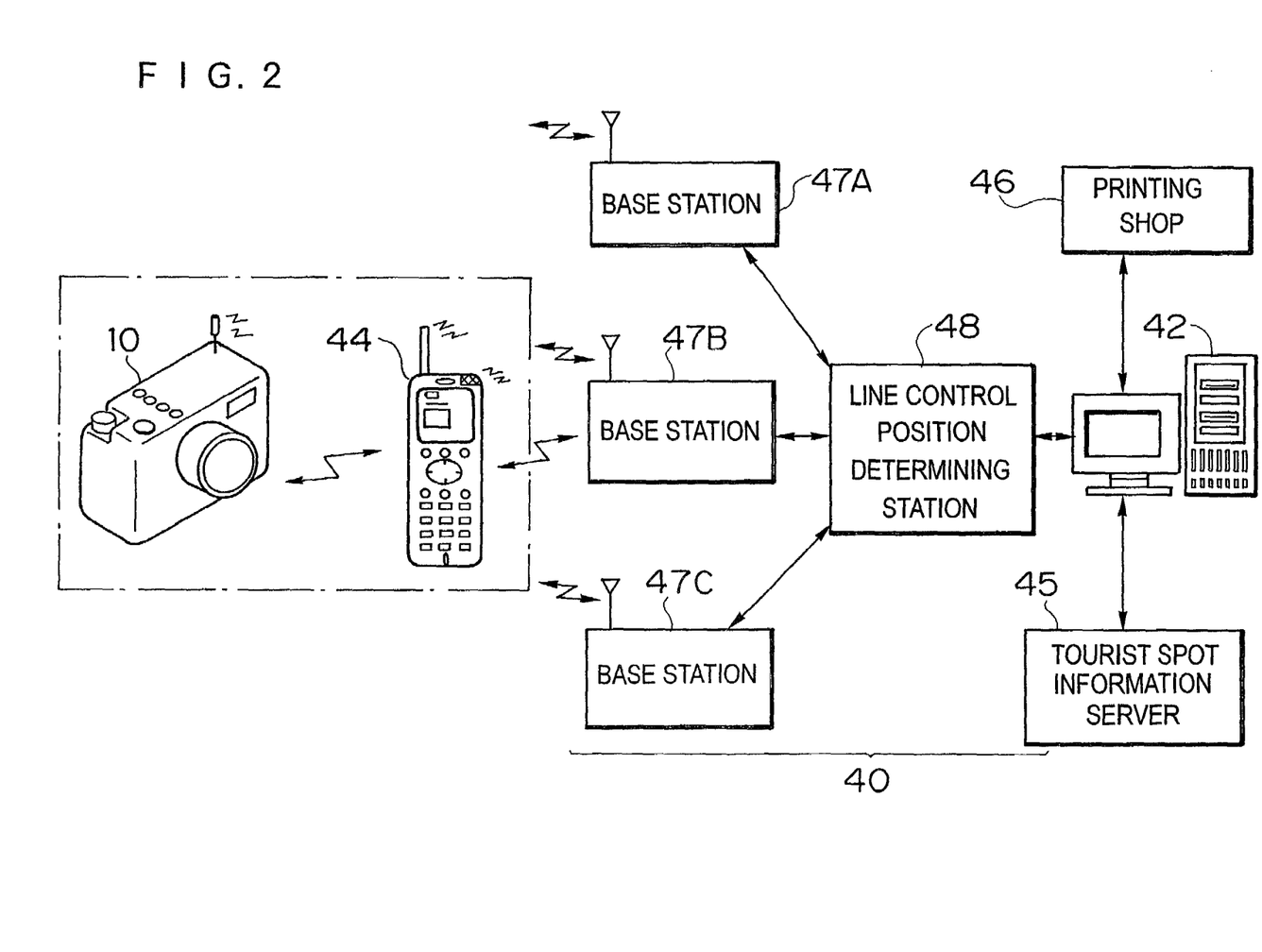
FIG. 2 shows configurations of various kinds of communication devices used when the electronic camera transmits and receives information.

FIG. 2 shows the configurations of various kinds of external communication devices employed when the electronic camera 10 transmits and receives information.

In FIG. 2, the external communication devices include a communication device 44 which communicates with the electronic camera 10 and can transmit information to and receive from a server 42 via a communication network 40 such as a public line, a tourist spot information server 45 connected in communication to the server 42, and a printing shop 46 for receiving and printing image information transmitted from the electronic camera 10 and supplying the image thus printed to the user.

In the tourist spot information server 45, the latest information of the tourist spot, image data such as the image of the past best scene of the tourist spot, a present landscape, etc. or guide map information, positional information and character information are stored. The tourist spot server 45 can transmit the information of the above described tourist spot in accordance with a request from the server 42.

The communication network 40 performs a communication with the external communication device 44 and comprises a plurality of base stations 47A, 47B, 47C, . . . , performing a communication with a line control position determining station 48. When the external communication device 44 and one of the above described plurality of base stations 47A, 47B and 47C transmit and receive information therebetween, a preliminary communication is previously carried out to search for the nearest base station 47B and determine a communication area, which is an area where the external communication device 44 is. This control is performed by the line control position determining station 48 so that the station 48 can inform the server 42 of the communication area. The server 42 can select the tourist spot information server 45 or the printing shop 46 in the vicinity of the communication area on the basis of the communication area information.

In an example shown in FIG. 2, although the electronic camera 10 communicates with the external communication device 44 through wireless communication means, it is to be understood that wired communication means in which the electronic camera 10 is connected to the external communication device 44 by a cable to perform communication may be employed. Further, the external communication device 44 may be a portable telephone capable of performing communication through a public line.

The communicating operation of the electronic camera 10 configured as described above will be described below.

The user sets the mode of the electronic camera 10 to a mode of "communication". Then, on the display 28 of the electronic camera 10, a display for urging a communication connecting destination to be selected is shown. The user designates a desired communication connecting destination from the communication connecting destination information displayed on the display 28. Then, the electronic camera 10 starts a communication with the server 42 in the neighborhood of the communication area through the external communication device 44. At this time, in the case where the external communication device 44 is a cellular type portable telephone, since the nearest base station 47B can identify the portable telephone, the portable telephone may be automatically connected to the nearest server 42. Further, when a plurality of servers 42 are present in the neighborhood, the user may select and designate one server 42 thereof.

When the communication between the server 42 and the electronic camera 10 is established, the server 42 transmits available contents information to the electronic camera 10. The information processing device 26 of the electronic camera 10 displays the received contents information on the display 28. The user selects a desired item by operating the information input device 24 on the basis of the displayed information.

The selected information is transmitted to the tourist spot information server 45 through the external communication device 44 and the server 42, and the electronic camera 10 receives the designated information. The received information is recorded on the recording medium 30 of the electronic camera 10 or the RAM provided in the information processing device 26. In this case, the electronic camera 10 may display the received sightseeing information or the images of tourist spots on the display 28.

Figure 3:
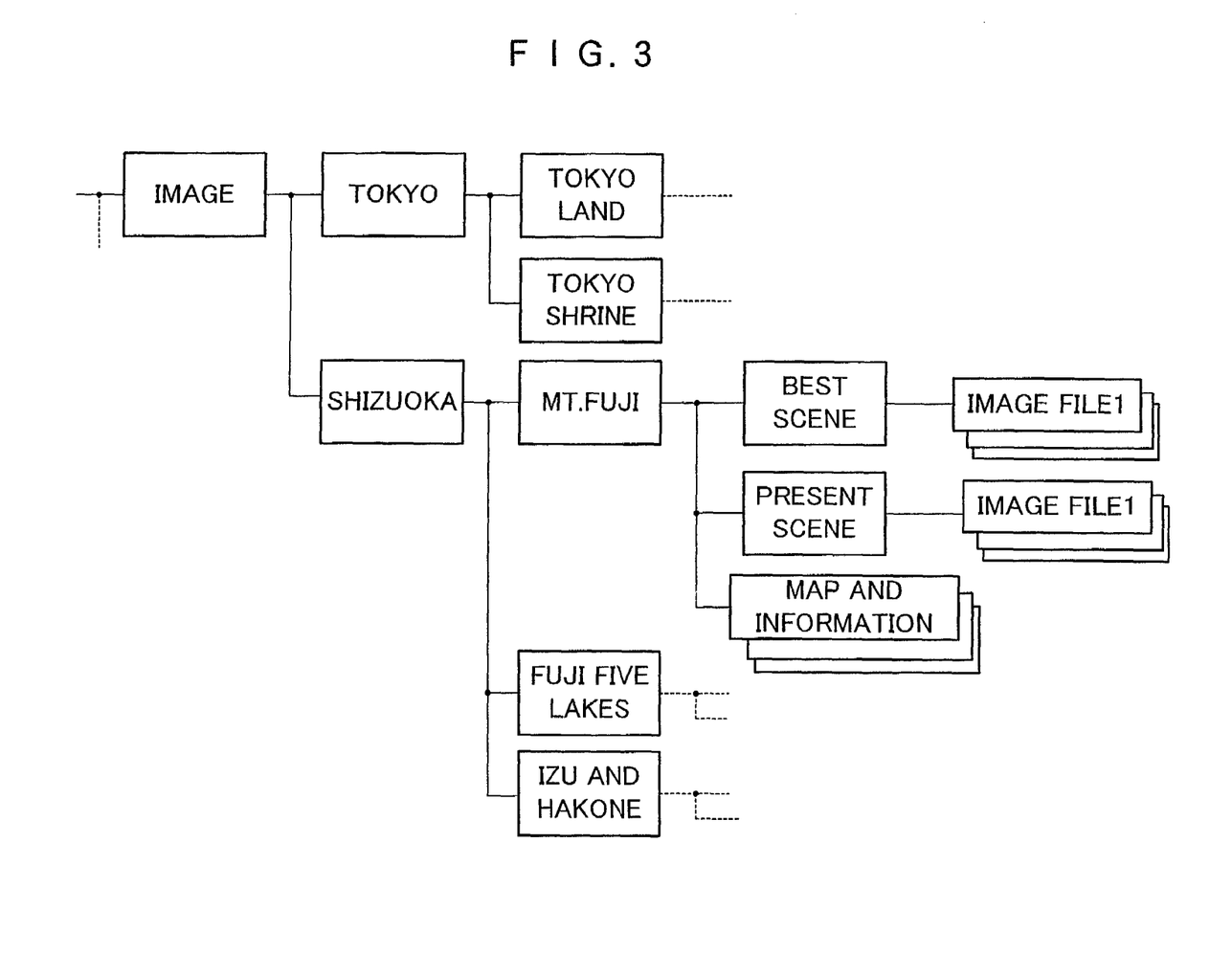
FIG. 3 is a diagram showing contents displayed by the electronic camera.

For example, in the case where the user gets the present scene of Mt. Fuji, when the items of "image", "Shizuoka" and "Mt. Fuji" are selected, and then, the "present scene" is selected from the contents displayed in a file structure shown in FIG. 3, the present image of Mt. Fuji is transmitted from the tourist spot information server 45 to the electronic camera 10. Further, as shown in FIG. 3, when there exist a plurality of neighboring tourist spots in adjacent areas such as "Mt. Fuji" and "the Fuji Five Lakes", the user may select a plurality of pieces of tourist spot information and obtain a plurality of pieces of image information.

The imaging operation of the electronic camera 10 will be described.

The user sets the mode of the electronic camera 10 to a mode of "imaging". The image of the object to be captured which is formed on the imaging device 12 of the electronic camera 10 is converted into an electric signal and displayed on the display 28. Then, while the optically-captured image displayed on the display 28 is viewed by directing the electronic camera 10 toward the object whose image is optically-captured, an angle, a focus and an exposure state relative to the object to be captured are determined, and then, the shutter release switch 16 is pressed to optically capture the image.

The image optically-captured is recorded on the recording medium 30.

Figure 4:
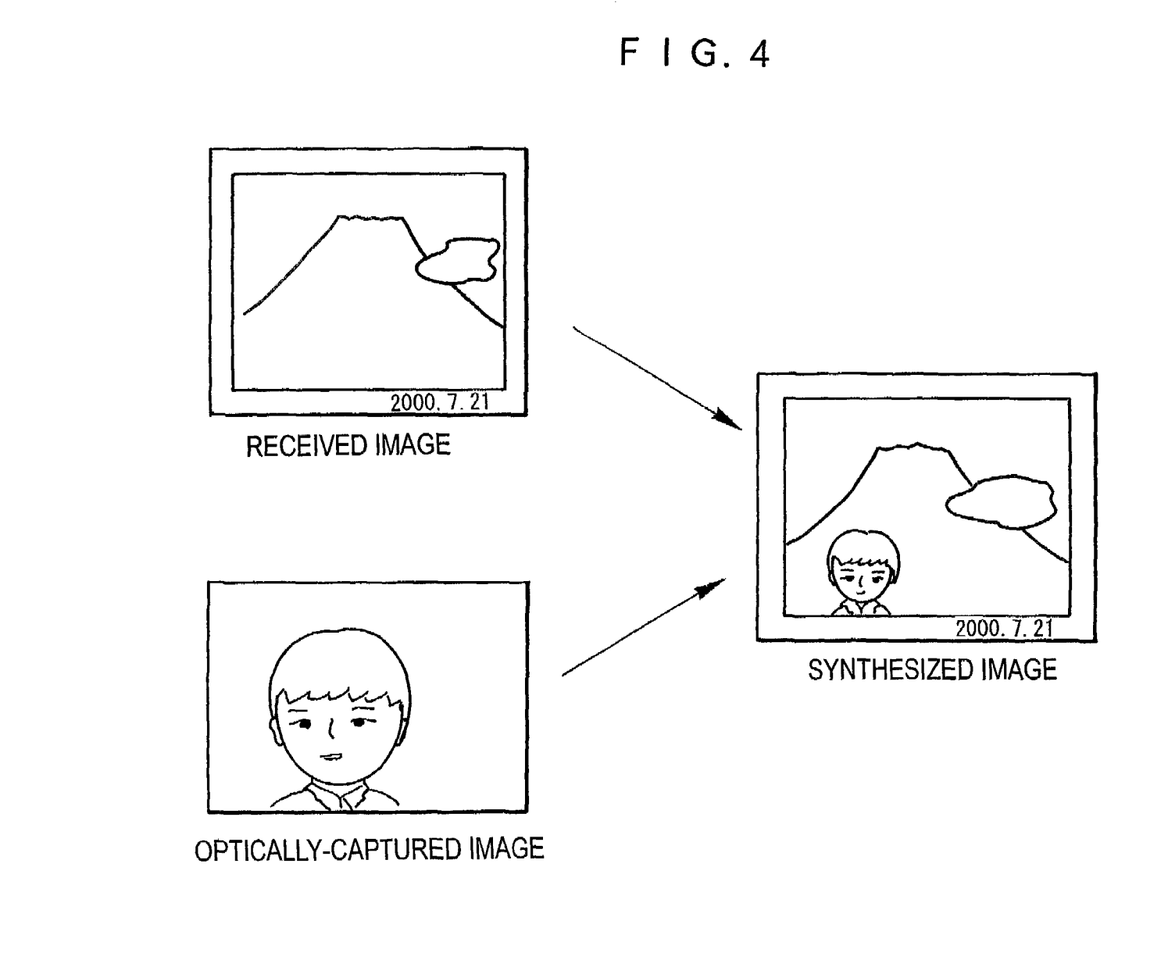
FIG. 4 is a diagram showing an embodiment in which an image received from a tourist spot information server is combined with an optically-captured image to form a new image.

FIG. 4 illustrates an embodiment in which the optically-captured image is combined with the image received from the tourist spot information server 45 to produce a new image.

As shown in FIG. 4, the image selected and received by the user from the tourist spot information server 45 is displayed on the display 28, and the user cuts and selects a necessary part by operating the information input device 24 and designates a range in which the received image is combined with the optically-captured image. Then, the user reads out the optically-captured image from the recording medium 30 to combine it with the above described image in a desired position. In this case, instead of reading out the optically-captured image from the recording medium 30, the range may be designated on the basis of a preview image to be optically-captured, the received image may be combined with the optically-captured image and the synthesized image may be displayed. In such a manner, the received image is combined with the optically-captured image, so that a synthesized image such as a synthesized photograph of the image of the past best scene of the tourist spot and the user that the user cannot obtain on that date or that time when the user visits the tourist spot can be formed. In the case where images are combined together, an image synthesizing apparatus such as a personal computer has been conventionally required. However, according to the present invention, the image information is downloaded from the tourist spot information server 45, so that a synthesized image can be readily formed in the electronic camera 10.

Figure 5:
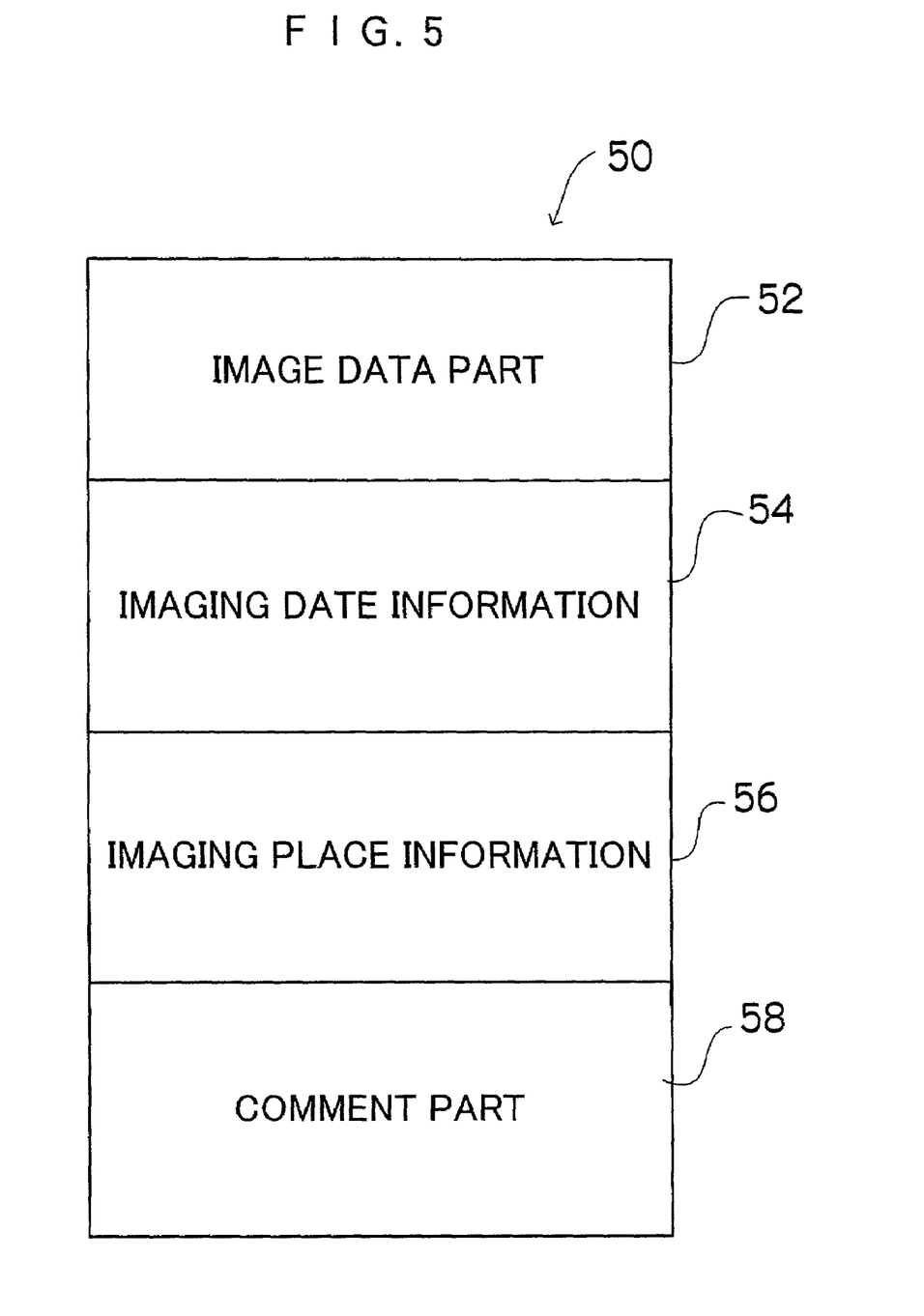
FIG. 5 is a diagram showing the structure of a file of the received image of a tourist spot.

FIG. 5 shows the structure of a file of a received image of a tourist spot.

Referring to FIG. 5, a file 50 of a received image comprises an image data part 52 in which the data of the image is recorded, imaging date information 54 in which information when the image was optically-captured is written, imaging place information 56 in which information related to places where the image was optically-captured is written, and a comment part 58 in which auxiliary information such as an explanation concerning advertisement or image data.

Figure 6:
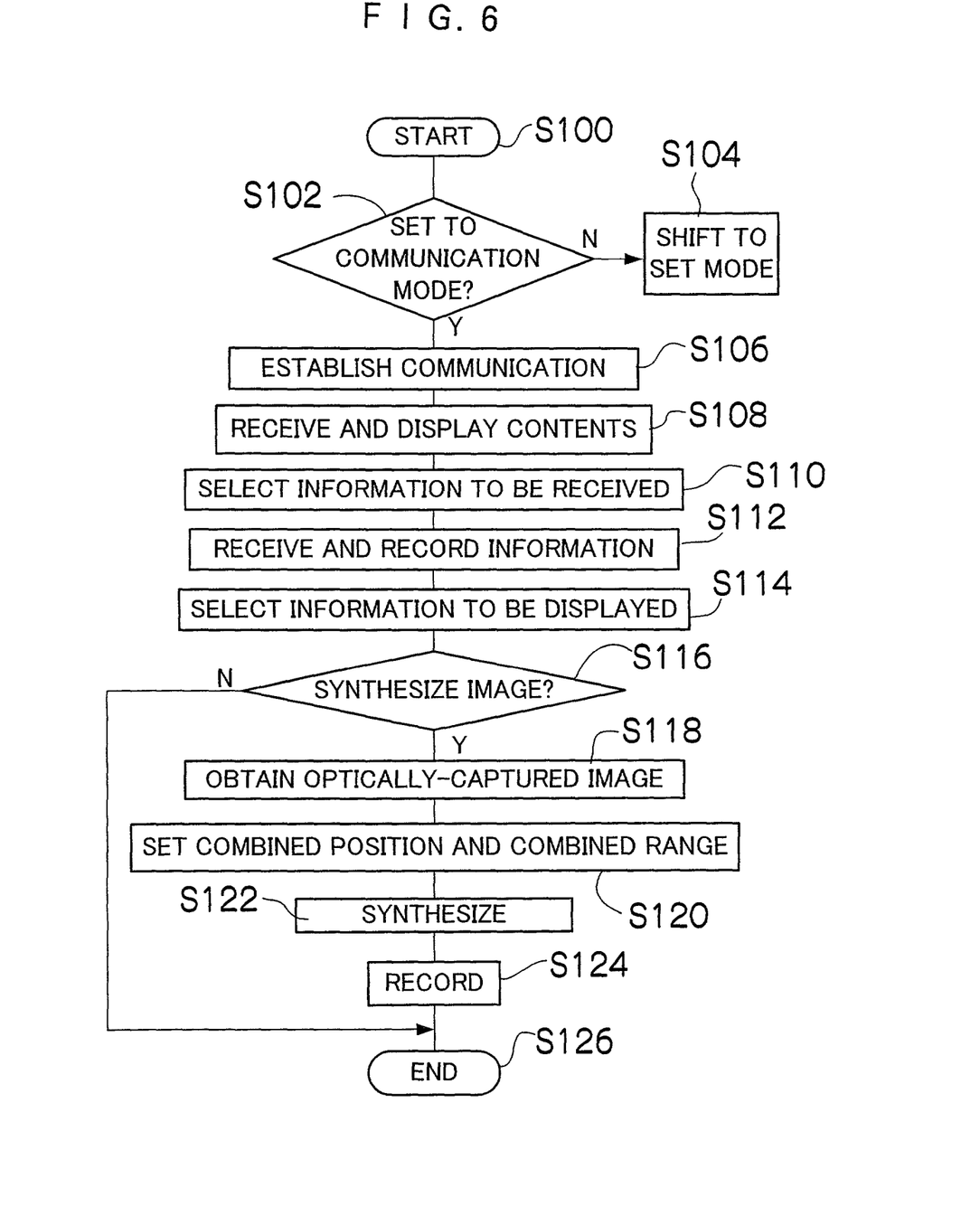
FIG. 6 is a flowchart showing a process for receiving image information.

FIG. 6 shows a flowchart for receiving the image information.

Referring to FIG. 6, when the processes of the electronic camera 10 are started in S100 of "start", the setting state of the mode change switch 18 is monitored in S102 of "set to communication mode?". If a mode that is currently set is not the communication mode, the procedure of the processes will branch through S104 of "shift to a set mode" to the processing program of the set mode. If the mode change switch 18 is set to the communication mode in S102, the procedure will advance to S106 of "establish a communication".

In S106, the electronic camera 10 starts a communication with the external communication device 44 by employing the communication device 32 and also starts a communication with the server 42 of the nearest access point. When the communication is established, contents information received via the server 42 is displayed on the display 28 in S108 of "receive and display contents".

The user operates the information input device 24 in S110 of "select information to be received" to select one or a plurality of pieces of desired information. The selected information is transmitted to the tourist spot information server 45 through the external communication device 44. The tourist spot information server 45 transmits one or a plurality of pieces of designated information to the electronic camera 10.

The electronic camera 10 receives the selected information and records the information on the recording medium 30 in S112 of "receive and record information". In subsequent S114 of "select information to be displayed", when a plurality of pieces of information are received from the tourist spot information server 45, one piece of information to be displayed is selected. The contents of the information to be displayed may be image information, map information or character information.

In S116 "synthesize image?", the user is asked to decide whether or not the received image is combined with the optically-captured image. If the synthesis of the images is not performed, the procedure will branch to S126 of "END" to finish the processes without performing a synthesizing process. If the synthesis of the images is performed, the procedure will advance to S118 of "obtain optically-captured image".

In S118, the image recorded on the recording medium 30 is selected, read out and displayed. Further, when a newly optically-captured image is combined with the received image, a mode for performing the imaging operation is selected to optically capture an image.

When the image to be combined with the received image is obtained, the combined position and the combined range of each image are designated by referring to a display screen in S120 of "set combined position and combined range". When the combined position and the combined range are determined, the procedure advances to S112 of "synthesize" and the information processing device 26 performs a process for combining the images. When a new image obtained by the synthesizing process is recorded, the newly formed image is recorded on the recording medium 30 in S124 of "record".

When the recording operation of the image is completed, the program advances to S126 of "END" to finish the processes for obtaining the image and combining the images.

As described above, the image received from the tourist spot information server 45 is combined with the optically-captured image in the electronic camera 10, so that the synthesizing process and the processing work of the images which is conventionally carried out by using a personal computer or the like can be easily realized in the electronic camera 10. Therefore, the images can be combined by a simple operation without requiring complicated works. Further, a variety of image information required for the synthesizing process can be acquired from the external tourist spot information server 45 through the external communication device 44.

Further, according to the present invention, a service can be performed in which the image formed in the electronic camera 10 as described above is transmitted to and printed in the printing shop 46, and the printed image is delivered to the user's house. A method for obtaining information related to the printing shop 46 and a method for receiving a print service will be described hereinafter.

Figure 7:
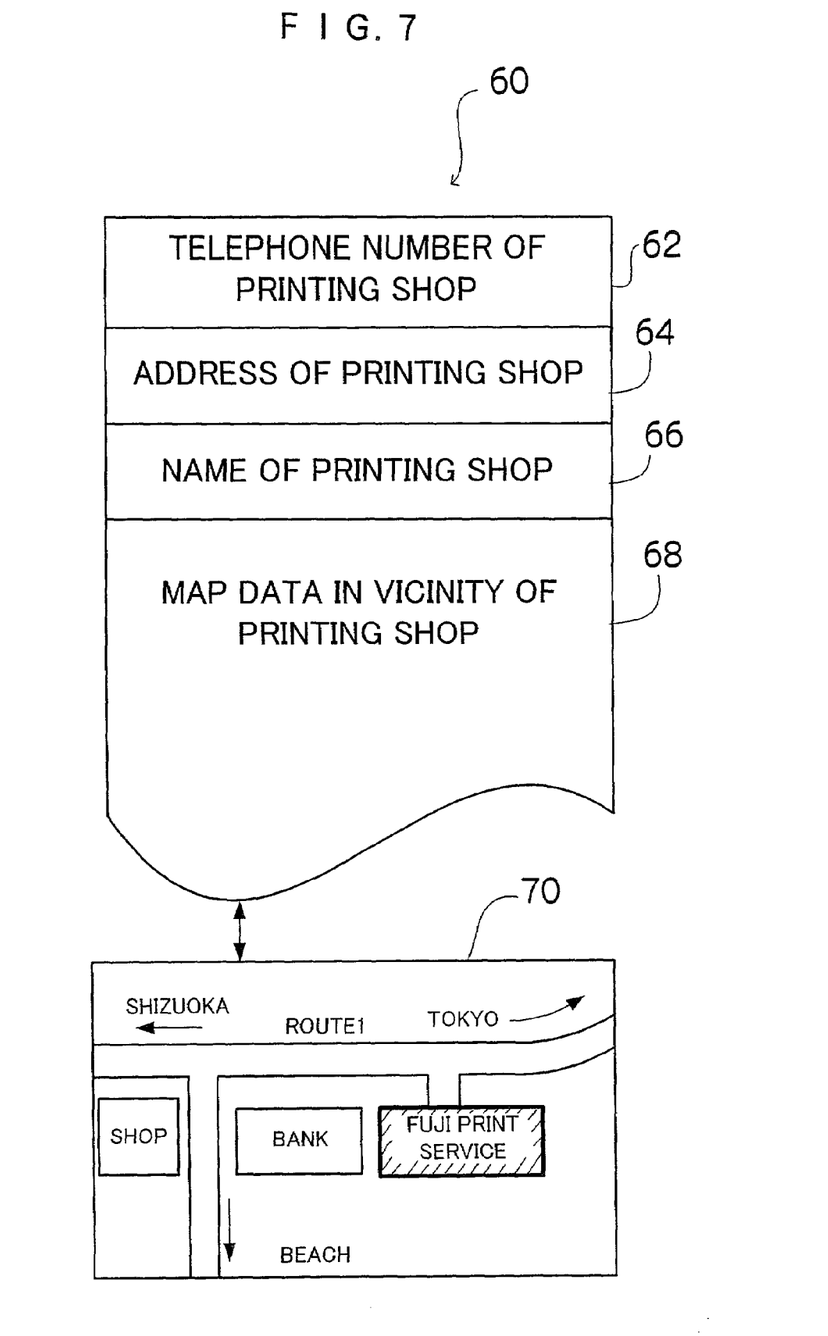
FIG. 7 is a diagram showing the structure of printing shop information and map information transmitted to the electronic camera from the printing shop.

FIG. 7 shows the structure of printing shop information 60 and map information 70 transmitted to the electronic camera 10 from the printing shop 46.

Referring to FIG. 7, the printing shop information 60 comprises the telephone number 62 of the printing shop, the address 64 of the printing shop, the name 66 of the printing shop and map data 68 in the vicinity of the printing shop. When the electronic camera 10 receives the above described information through the communication network 40, the electronic camera 10 displays the printing shop information 60 and the map information 70 on the display 28.

In this case, the display 28 may be controlled to display the printing shop information 60 and the map information 70 on separate screens, and then, the user may operate the information input device 24 to switch and display them. When the user designates the printing shop 46 to be used while viewing the display, the procedure advances to a process for selecting a desired image to be printed and transmitting the selected image.

Figure 8:
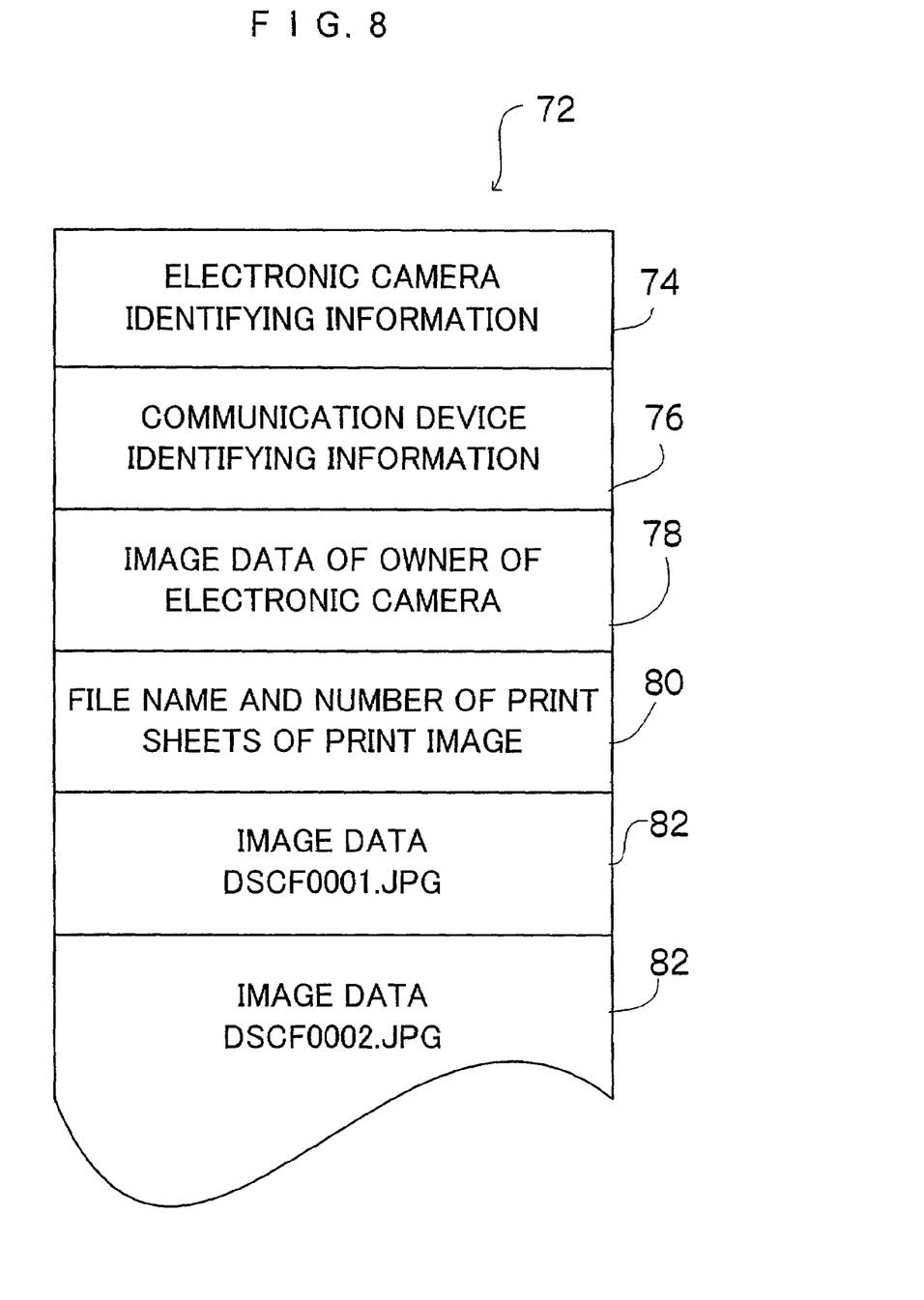
FIG. 8 is a diagram showing print service information transmitted to the printing shop from the electronic camera.

FIG. 8 shows print service information 72 transmitted to the printing shop 46 from the electronic camera 10.

With reference to FIG. 8, the print service information 72 comprises electronic camera identifying information 74 unique to the electronic camera 10 as a transmitter, communication device identifying information 76 such as the telephone number of the portable telephone, the image data 78 of the owner of the electronic camera 10, the file name and the number 80 of print sheets of the print image requested to be printed, and image data 82, 82, . . . , to be printed.

For the communication device identifying information 76, the electronic camera 10 or the server 42 may automatically obtain the telephone number of the portable telephone of the user upon starting a communication and register it in the print service information 72. Further, the image data 78 of the owner of the electronic camera 10 is created by photographing the owner by using the electronic camera 10 and attaching the data thus obtained thereto. The image data 78 of the owner of the electronic camera 10 may be used in place of the name of an orderer.

Figure 9:
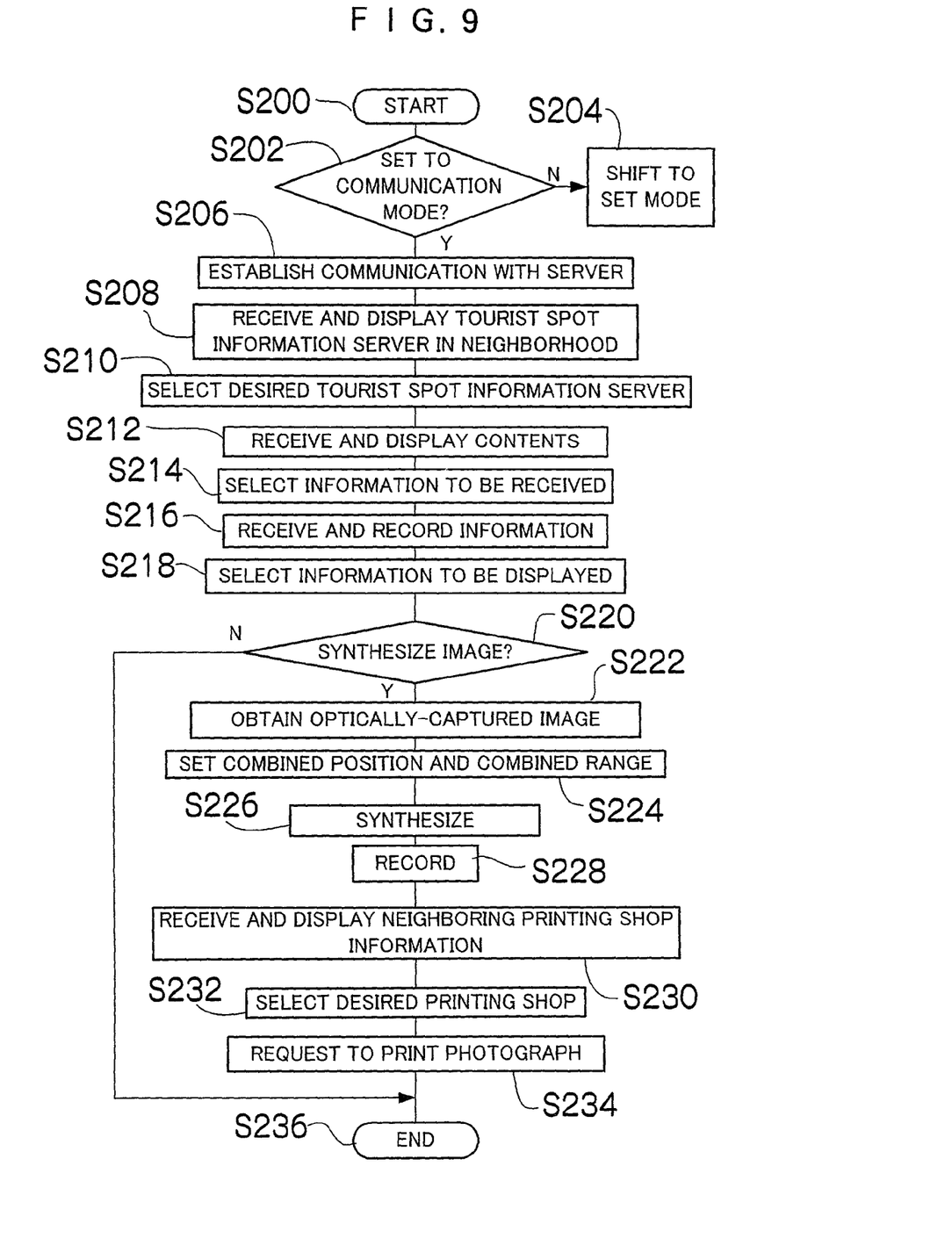
FIG. 9 is a flowchart when the electronic camera receives the image information and transmits the print service information.

FIG. 9 shows a flowchart in which the electronic camera 10 receives the image information and transmits the print service information 72.

Referring to FIG. 9, when the processes of the electronic camera 10 are started in S200 of "start", the setting state of the mode change switch 18 is monitored in S202 of "set to communication mode?". If a mode that is currently set is not the communication mode, the procedure of the processes will branch through S204 of "shift to a set mode" to the processing program of the set mode. If the mode change switch 18 is set to the communication mode in S202, the procedure will advance to S206 of "establish a communication with server".

In S206, the electronic camera 10 starts a communication with the external communication device 44 by using the communication device 32, and also starts a communication with the server 42 as the nearest access point. When the communication is established therebetween, information received from the tourist spot information server 45 in the neighborhood is displayed in next S208 of "receive and display tourist spot information server in the neighborhood".

In next S210 of "select desired tourist spot information server", the user selects a desired tourist spot information server 45 from the information displayed on the display 28. Then, the selected information is transmitted to the server 42 through the external communication device 44 and the communication network 40. The electronic camera 10 receives contents information from the selected tourist spot information server 45. The electronic camera 10 displays the received contents information on the display 28 in S212 of "receive and display contents".

The user operates the information input device 24 to select one or a plurality of pieces of desired information in S214 of "select information to be received". The selected information is transmitted to the tourist spot information server 45 through the external communication device 44 and the tourist spot information server 45 transmits one or a plurality of pieces of designated information to the electronic camera 10.

The electronic camera 10 receives the selected information and records it on the recording medium 30 in S216 of "receive and record information". In S218 of "select information to be displayed", when a plurality of pieces of information are received from the tourist spot information server 45, a process for selecting the information to be displayed is carried out. The contents to be displayed may be image information, map information or character information.

In S220 of "synthesize image?", the user is asked to decide whether or not the received image is combined with the optically-captured image. If the synthesis of the images is not performed, the procedure will branch to S236 of "END" to finish the processes without performing a synthesizing process. If the synthesis of the images is performed, the procedure will advance to S222 of "obtain optically-captured image".

In S222, the image recorded on the recording medium 30 is selected, read out and displayed. Further, when a newly optically-captured image is combined with the received image, a mode for performing the imaging operation is selected to optically capture an image.

When the image to be combined with the received image is obtained, the combined position and the combined range of each image are designated by referring to a display screen in S224 of "set combined position and combined range". When the combined position and the combined range are determined, the procedure advances to S226 of "synthesize". Then, the information processing device 26 carries out a process for combining the images. When a new image obtained by the synthesizing process is recorded, the newly formed image is recorded on the recording medium 30 in S228 of "record".

When the recording process of the image is completed and the user desires to print the image, a process for calling the printing shop 46 is designated. When the electronic camera 10 requests the server 42 to supply the information of the printing shop 46, the server 42 selects the information of the nearest or neighboring printing shop 46 and transmits the information to the electronic camera 10. The electronic camera 10 displays the received printing shop information 60 or the map information 70 in S230 of "receive and display neighboring printing shop information".

In S232 of "select a desired printing shop", a desired printing shop 46 is selected from the displayed printing shops 46. The selected information is transmitted to the printing shop 46 from the electronic camera 10. After that, the printing shop 46 may transmit information concerning conditions of printing photograph to the electronic camera 10 so that the user can select various kinds of conditions.

When printing conditions or the image to be printed are determined, the electronic camera 10 transmits the print service information 72 shown in FIG. 8 to the printing shop 46 in S234 of "request to print photograph".

When the request to print the photograph is finished, the program advances to S236 of "END" to finish the processes for obtaining the image and requesting to print the photograph. Upon request to print the photograph, the printing shop 46 may inform the electronic camera 10 of a finish place or an expected finish date.

As mentioned above, since the information processing device 26 of the electronic camera 10 combines the image received from the tourist spot information server 45 with the image obtained by an imaging operation and requests the printing shop 46 to print the synthesized photograph, the processes for combining the images, and processing and printing the synthesized images which is conventionally performed by employing the personal computer or the like can be readily realized by the electronic camera 10. Therefore, the images can be combined and the synthesized images can be printed by a simple operation without requiring a complicated work.

Now, a description is directed to an embodiment in which an imaging position is obtained on the basis of the communication area information of a system provided in the external communication device 44 and is recorded as the auxiliary information of the image, when the external communication device 44 is a portable telephone with a narrow range of communication area such as the cellular phone system and the personal handy-phone system (PHS).

As shown in FIG. 2, the electronic camera 10 is connected to the external communication device 44 (portable telephone including a PHS) in a communication. When the communication with a prescribed server 42 is started through the communication network 40, the server 42 can obtain the positional information of the nearest base station 47B relative to the external communication device 44 from the line control position determining station 48. The server 42 transmits the map information in the vicinity of the base station 47B to the electronic camera 10 on the basis of the positional information of the base station 47B. This map information may include only a map or information combined with the positional information of the longitude and latitude.

The electronic camera 10 displays the received map information on the display 28 to inform the user of the map information. The user recognizes a place where the user is present from the displayed map information. If an accuracy is required for the positional information and there exists a difference between the position where the user is present and the position of the map information, a current position will be corrected by using the information input device 24 such as the cursor switch 20 by comparing the current position with a circumferential state.

When the user optically captures an image under this state, the information of the imaging position (present position) is recorded as the auxiliary information together with the image data obtained by the imaging operation. Then, when the imaging operation is performed by moving from the place a little, the previously employed positional information can be corrected on a map to form new image information.

Further, when an imaging operation is carried out at a position deviated from the displayed map, the map information is downloaded again from the server 42 and utilized. Still further, in the case where the user is moving in the displayed map so that it is troublesome to manually correct imaging information every time, it is possible to perform a communication with the server 42 and to download only the positional information and automatically change the positional information. Thus, the information processing device 26 may classify the optically-captured images and store them on the basis of the positional information of the imaging place acquired in such a manner.

Still further, in the case where the imaging operation is carried out in a place where the external communication device 44 cannot perform a communication with the communication network 40 as in the underground of a building or a place where the use of the portable telephone is prohibited, the map information is previously gotten from the server 42 and the positional information is changed by using the displayed map information, so that the imaging position information can be recorded as well as the image data to be recorded.

Still further, in the case where the imaging operation is continuously carried out so that the image data in the recording medium 30 of the electronic camera 10 is increased and a remaining recording capacity is decreased, a communication with a prescribed server 42 may be started through the external communication device 44 to upload the information recorded in the recording medium 30 in the server 42. The uploaded information can be retrieved in such a way that the user downloads it from the server 42, for instance, after the user returns home.

The server 42 side can register images to which the positional information is affixed on the map as associated area information, create and open to the public the data base thereof, with consent of the imaging person or the photographer.

Figure 10:
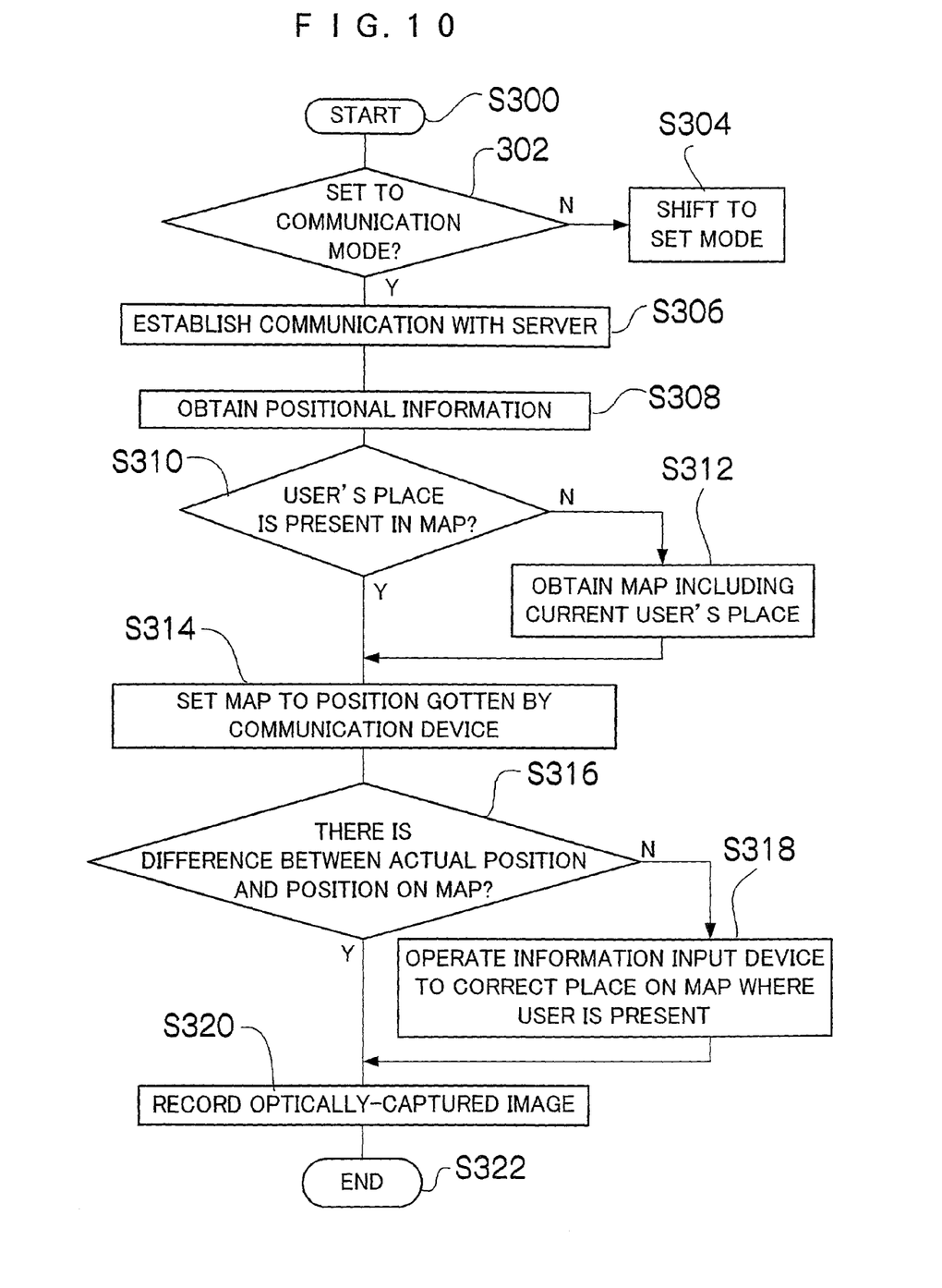
FIG. 10 is a flowchart when the electronic camera receives map information and records it on the optically-captured image as auxiliary information.

FIG. 10 shows a flowchart when the electronic camera 10 receives the map information and records the map information on the optically-captured image as the auxiliary information.

Referring to FIG. 10, when the processes of the electronic camera 10 are started in step S300 of "start", the setting state of the mode change switch 18 is monitored in S302 of "set to communication mode?". If the set mode is not the communication mode, the procedure will branch through S304 of "shift to set mode" to the processing program of the set mode. If the mode change switch 18 is set to the communication mode in S302, the procedure will advance to S306 of "establish a communication with a server".

In S306, the electronic camera 10 starts a communication with the external communication device 44 by using the communication device 32, and also automatically starts a communication with the server 42 as the nearest access point. When the communication is established therebetween, map information in the neighborhood received from the server 42 is obtained and displayed in S308 of "obtain positional information".

In step S310 of "user's place is present in a map?", the user is asked to decide whether or not the place where the user is present is included in the map displayed on the display 28. If the place where the user is present is included in the displayed map, the procedure will advance to S314. If the place where the user is present is not included in the displayed map, the procedure will branch to S312 of "obtain a map including a current user's place" to perform a process for receiving another map in which the user's current place is included, and advance to S314 of "set a map to a position gotten by the communication device".

The user sets the map to the position obtained by the external communication device 44 in S314 and advances to S316 to decide "whether there is not a difference between the position on the map and an actual position". In S316, it is decided whether or not the place where the user is present is deviated from the position displayed on the map. If there exists a difference between the place in which the user is present and the position shown on the map, the procedure will branch to S318 of "operate the information input device to correct the place on the map where the user is present".

In S318, the user operates the information input device 24 to correct a difference between the place in which the user is present and the position on the map. When the correction is completed, the program advances to S320 of "record optically-captured image".

In S320, a mode for performing the imaging operation is selected to optically capture the image and the information of the place where the user is present is affixed to the image information and recorded on the recording medium 30.

When the recording operation of the image is completed, the program advances to S322 of "END" to finish the processes for obtaining the image and recording the imaging position information.

As mentioned above, since the portable telephone is connected to the electronic camera 10 under a communication, a function for obtaining the positional information of the base station 47B near a communication spot is utilized and the electronic camera 10 receives and records a map in the neighborhood of the base station 47B on the basis of the positional information, the information of the imaging position can be easily affixed to the optically-captured image and they can be recorded. Further, since the electronic camera 10 can transmit the map information and the image information to the server 42, the user can optically capture a large quantity of images irrespective of the recording capacity of the recording medium 30 of the electronic camera 10. Besides, it is not necessary to carry a large quantity of recording media 30 in reserve.

Still further, in the case where the optical image pickup person cannot specify a place where he is present in an unknown area, the above described function capable of obtaining the positional information of the base station 47B near the communication point is utilized to display a current position and a map so that he can know the current place where he is present.

Furthermore, two persons present in remote places can exchange respective map information through the portable telephones in order to know respective places where they are present so that they can mutually understand the respective places.

As described above, according to the present invention, the electronic camera obtains a desired image from a server storing images of tourist spots and providing an image in accordance with a request from a user through an external communication device capable of determining a communication area where the external communication device is, and the electronic camera comprises: a communication device which transmits a request for obtaining an image of a tourist spot to the server through the external communication device and receives information and the image of the tourist spot around the communication area from the server; a display which displays the information and the image of the tourist spot obtained from the server through the external communication device; an information input device which selects and inputs a desired image from the displayed tourist spot information; and a recording medium which records the image of the tourist spot received through the external communication device and records an image gotten by an imaging operation. Thus, the user can easily acquire the expected images of the landscape of the tourist spot in the neighborhood from the server, even when an expected landscape cannot be photographed due to bad weather.

Further, according to another aspect of the present invention, the electronic camera transmits information to and receives information from a server having information of printing shops and transferring an image to a printing shop in accordance with a request for print from a user through an external communication device capable of determining a communication area where the external communication device is, and the electronic camera comprises: a communication device which receives printing shop information in a neighborhood of the communicating area from the server and transmits an image to the printing shop; a display which displays the printing shop information obtained from the server through the communication device; and an information input device which selects and inputs a desired printing shop from the displayed printing shop information. Thus, the user can easily select the printing shop to order to print the image.

Further, according to the present invention, the information obtaining system comprises: a server which stores images of tourist spots and provides an image in accordance with a request from a user; and an electronic camera which obtains a desired image from the server through an external communication device capable of determining a communication area where the external communication device is, wherein the electronic camera comprises: an imaging device which captures an image of an object; a communication device which transmits a request for obtaining an image of a tourist spot to the server through the external communication device and receives the image of the tourist spot from the server; and a recording medium which records the image of the tourist spot received by the communication device and the image captured by an imaging operation, wherein the server comprises: an image selecting device which selects the image of the tourist spot in the neighborhood on the basis of the information of the communication area of the external communication device when there is sent the request for obtaining the image of the tourist spot through the external communication device from the electronic camera; and a transmitting device which transmits the selected image of the tourist spot to the electronic camera. Thus, the user can easily get the images of the tourist spots in the neighborhood.

Further, according to the present invention, the print order system comprises: an electronic camera which transmits an image ordered to be printed to a server through an external communication device capable of determining a communication area where the external communication device is; and the server which receives the order for printing the image transmitted from the electronic camera through the external communication device and transmits the received image to a printing shop in a neighborhood of the communication area, wherein the electronic camera comprises: an information input device which selects and inputs the image ordered to be printed from a recording medium on which images are recorded; a communication device which transmits the image ordered to be printed which is selected and inputted to the server through the external communication device and receives information of the printing shop in the neighborhood from the server; and a display which displays the received information of the printing shop, wherein the server comprises: a selecting device which selects the printing shop in the neighborhood on the basis of information of the communication area of the external communication device when the print order is requested from the electronic camera through the external communication device; and a transmitting device which transmits the image ordered to be printed to the selected printing shop and transmits the information of the printing shop to the electronic camera. Thus, the user can easily select the printing shop to order to print the image.

Furthermore, according to the present invention, the information obtaining system comprises: a server which has map data and provides the map data in accordance with a request from a user; and an electronic camera which obtains desired map data from the server through an external communication device capable of determining a communication area where the external communication device is, wherein the electronic camera comprises: a communication device which transmits a request for map data to the server through the external communication device and receives the map data from the server; a recording medium which records the map data received by the communication device; and a display which displays a map on the basis of the map data recorded on the recording medium, wherein the server comprises: a selecting device which selects the map data in a neighborhood on the basis of the information of the communication area of the external communication device when a request for obtaining the map data is supplied from the electronic camera; and a transmitting device which transmits the map data selected by the selecting device to the electronic camera. Thus, the user can easily obtain the map of the tourist spot in the neighborhood.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera which obtains a desired image from a server storing images of tourist spots and providing an image in accordance with a request from a user through an external communication device, the electronic camera comprising:

a communication device which transmits a request for obtaining an image of a tourist spot to the server through the external communication device which determines a communication area in which the external communication device is located, and receives information and the image of the tourist spot around the communication area from the server;

a display which displays the information and the image of the tourist spot obtained from the server through the external communication device;

an information input device which selects and inputs a desired image from the displayed tourist spot information; and a recording medium which records the image of the tourist spot received through the external communication device and records an image gotten by an imaging operation.

2. The electronic camera according to claim 1, further comprising:

an information processing device which combines the image of the tourist spot recorded on the recording medium with the image obtained by the imaging operation.

3. The electronic camera according to claim 1, wherein the server determines the communication area on the basis of communication area information informed by a station.

4. The electronic camera according to claim 1, wherein the external communication device is included in a wireless communication network.

5. The electronic camera according to claim 4, wherein said wireless communication network comprises a plurality of base stations, said external communication device communicating with said server via one of said plurality of base stations.

6. The electronic camera according to claim 5, wherein said wireless communication network further comprises a line control position determination station which controls said external communication device to determine one of said plurality of base stations which is nearest to said external communication device.

7. The electronic camera according to claim 6, wherein said line control position determination station controls said external communication device to determine said communication area in which said external communication device is located, and transmits information identifying said communication area to said server.

8. The electronic camera according to claim 7, wherein said server selects a tourist spot information server based on said information identifying said communication area.

9. The electronic camera according to claim 1, wherein said communication device wirelessly transmits said request to the server through the external communication device, and wirelessly receives said information and the image of the tourist spot around the communication area from the server.

10. The electronic camera according to claim 1, further comprising:
a mode change switch for selecting a mode from a plurality of modes of said electronic camera,
wherein upon selecting a communication mode using said mode change switch, said display displays a screen for selecting a communication connecting destination.

11. The electronic camera according to claim 10, wherein upon selecting said communication connecting destination, said camera starts a communication with said server through said external communication device.

12. The electronic camera according to claim 1, further comprising:
a display which displays said information and said image;
an information input device which selects and inputs a desired image from the displayed information; and
a recording medium which records the image.

13. An information obtaining system, comprising:
a server which stores images of tourist spots and provides an image in accordance with a request from a user; and
an electronic camera which obtains a desired image from the server through an external communication device,
wherein the electronic camera comprises:
an imaging device which captures an image of an object;
a communication device which transmits a request for obtaining an image of a tourist spot to the server through the external communication device which determines a communication area in which the external communication device is located, and receives the image of the tourist spot from the server; and
a recording medium which records the image of the tourist spot received by the communication device and the image captured by an imaging operation,
wherein the server comprises:
an image selecting device which selects the image of the tourist spot in the neighborhood on the basis of the information of the communication area of the external communication device when there is sent the request for obtaining the image of the tourist spot through the external communication device from the electronic camera; and
a transmitting device which transmits the selected image of the tourist spot to the electronic camera.

14. The information obtaining system according to claim 13, wherein the electronic camera further comprises an information processing device which combines the image of the tourist spot recorded on the recording medium with the image obtained by the imaging operation.

15. An electronic camera, comprising:
a communication device which:
transmits a request for an image to a server through an external communication device in a wireless communication network, said external communication device determining a communication area in which the external communication device is located and sending information identifying said communication area to said server; and
in said camera, receives information and the image from the server through said external communication device, said image being selected by said server based on said information identifying said communication area.

* * * * *